(12) United States Patent
Goh

(10) Patent No.: US 9,387,397 B2
(45) Date of Patent: Jul. 12, 2016

(54) PERIPHERAL APPARATUS AND METHOD OF CONSTRUCTION

(71) Applicant: Sony Computer Entertainment Europe Limited, London (GB)

(72) Inventor: Yee Woon Goh, London (GB)

(73) Assignee: Sony Computer Entertainment Inc. (JP)

(*) Notice: Subject to any disclaimer, the term of this patent is extended or adjusted under 35 U.S.C. 154(b) by 0 days.

(21) Appl. No.: 14/251,793

(22) Filed: Apr. 14, 2014

(65) Prior Publication Data
US 2014/0315640 A1 Oct. 23, 2014

(30) Foreign Application Priority Data
Apr. 17, 2013 (GB) .................................. 1306963.8

(51) Int. Cl.
*A63F 13/24* (2014.01)
*A63F 13/20* (2014.01)
*G06F 3/02* (2006.01)
*G06F 17/50* (2006.01)
*A63F 13/98* (2014.01)

(52) U.S. Cl.
CPC .................. *A63F 13/06* (2013.01); *A63F 13/02* (2013.01); *A63F 13/24* (2014.09); *G06F 3/0202* (2013.01); *G06F 17/50* (2013.01)

(58) Field of Classification Search
CPC ......... A63F 13/08; A63F 13/24; A63F 13/98; A63F 2300/10; A63F 2300/1043
USPC ...................................... 463/36, 37; 345/156
See application file for complete search history.

(56) References Cited

U.S. PATENT DOCUMENTS

| 6,278,501 B1 | 8/2001 | Lin |
| 2005/0134570 A1* | 6/2005 | Strawn et al. .................. 345/169 |
| 2008/0280681 A1 | 11/2008 | Kidakarn |
| 2009/0146958 A1 | 6/2009 | Ikeda et al. |
| 2011/0222081 A1* | 9/2011 | Yi et al. ........................... 358/1.9 |
| 2012/0098742 A1* | 4/2012 | Pincus et al. .................. 345/157 |
| 2012/0232857 A1 | 9/2012 | Fisker et al. |

FOREIGN PATENT DOCUMENTS

WO 2007095082 A2 8/2007

OTHER PUBLICATIONS

Extended European Search Report for Application No. EP14163441 dated May 15, 2014.
K. Sangani: "How to print gadgets [inkjet printing]", Engineering & Technology, vol. 8, No. 1, Feb. 1, 2013, pp. 58-60, XP055115884, the whole document.

(Continued)

*Primary Examiner* — Allen Chan
(74) *Attorney, Agent, or Firm* — Lerner, David, Littenberg, Krumholz & Mentlik, LLP

(57) ABSTRACT

A method of producing a handheld videogame controller is provided. The method includes providing a circuit board of a predetermined fixed size, the circuit board comprising a plurality of switches at predetermined positions. The method further includes obtaining measurements of at least a first hand of a user for whom the handheld videogame controller is to be produced, modifying a design of at least a first part of the handheld videogame controller responsive to the measurements, and 3D printing one or more modified parts of the handheld videogame controller using the modified design.

12 Claims, 8 Drawing Sheets

(56) References Cited

OTHER PUBLICATIONS

K. Sangani: "How to print gadgets [inkjet printing]", Engineering & Technology, vol. 8, No. 1, Feb. 1, 2013, pp. 58-60, XP55115884 (see whole disclosure, and note in particular the figures on p. 3).
"Evaluating Video Game Controller Usability as Related to User Hand Size", Brown et al., available online at: <http://altchi.org/2013/submissions/submission_michelle.brown_1.pdf>, Apr. 27-May 2, 2013.
"University of Warwick Engineers Pave the Way Towards 3D Printing of Personal Electronics", available at: <http://cacm.acm.org/news/157841-engineers-pave-the-way-towards-3-d-printing-of-personalelectronics/full text>, Nov. 28, 2012.
Combined Search and Examination Report for Application No. GB1306963.8 dated Oct. 17, 2013.

* cited by examiner

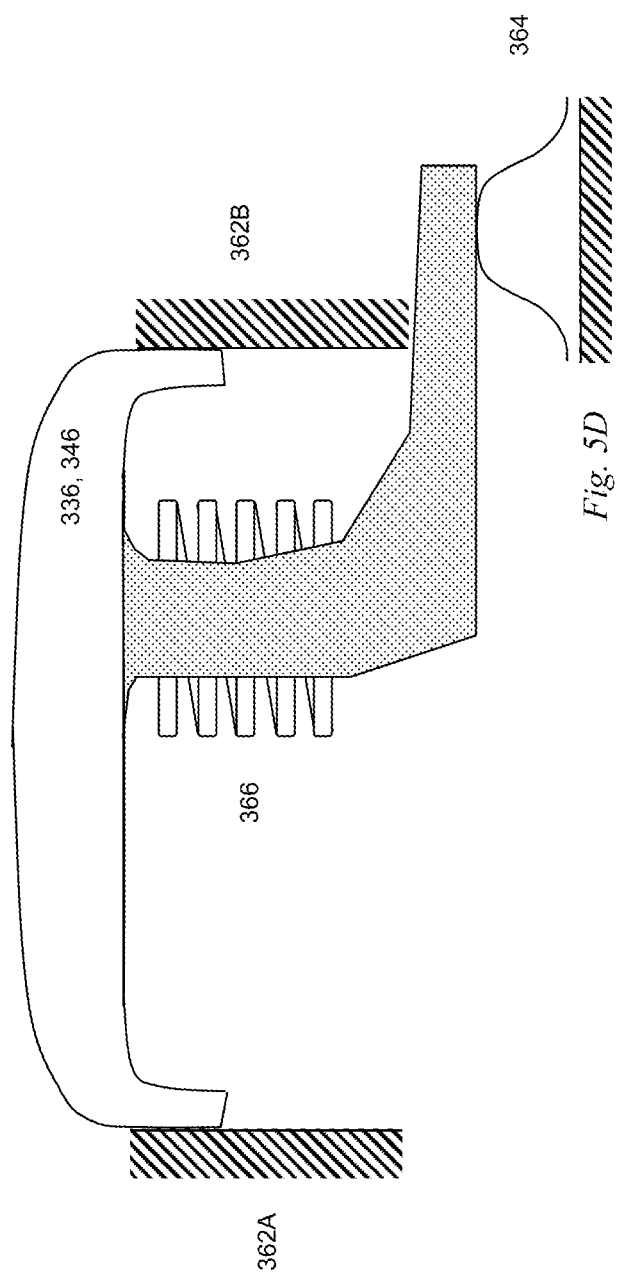

PERIPHERAL APPARATUS AND METHOD OF CONSTRUCTION

CROSS REFERENCE TO RELATED APPLICATIONS

The present application claims the benefit of and priority to GB Application No. 1306963.8, filed Apr. 17, 2013, the entire disclosure of which is incorporated by reference herein.

BACKGROUND OF THE INVENTION

1. Field of the Invention

The present invention relates to a peripheral apparatus and method of construction.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Traditional games consoles utilise a number of peripheral devices that are held or otherwise interacted with by a user, including for example the Sony® SIX-AXIS handheld game controller, the PlayStation Move® controller, and for 3D games a wide range of 3D glasses (active shutter glasses) or next-generation virtual reality headsets, such as the Sony HMZ-T1 personal 3D viewer.

These peripheral devices generally need to be ergonomically comfortable for the user, but also need to be mass produced. Consequently some may have adjustable fittings (such as the headset) but others do not, relying on the user to adapt to the control layout. This is generally possible, but may not be easy for small children or people with large hands.

Consequently there is a need to improve the ergonomics of peripheral devices for video games control and viewing.

The present invention aims to address or mitigate the above need.

SUMMARY OF THE INVENTION

In a first aspect, a method of producing a handheld videogame controller is provided.

In another aspect, a handheld videogame controller kit is provided.

In another aspect, a handheld videogame controller is provided.

In another aspect, a pair of active shutter glasses is provided.

Further respective aspects and features of the invention are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A-D are schematic diagrams of respective modifications to a button of a handheld videogame controller in accordance with an embodiment of the present invention.

DESCRIPTION OF THE EMBODIMENTS

A peripheral apparatus and method of construction are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Handheld Controller

Figure 1B:
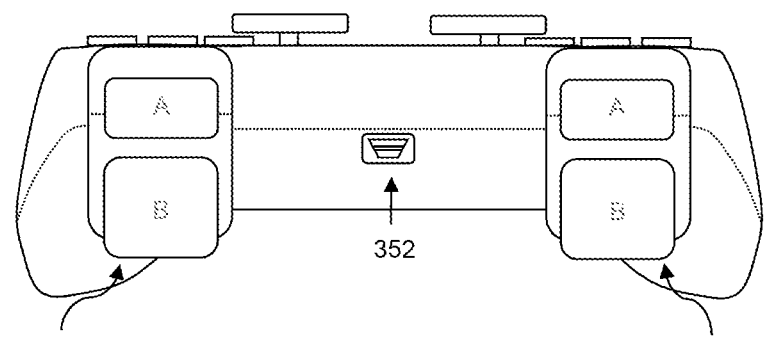
FIGS. 1A-C are schematic diagrams of a handheld videogame controller from three different viewpoints.
Figure 1A:
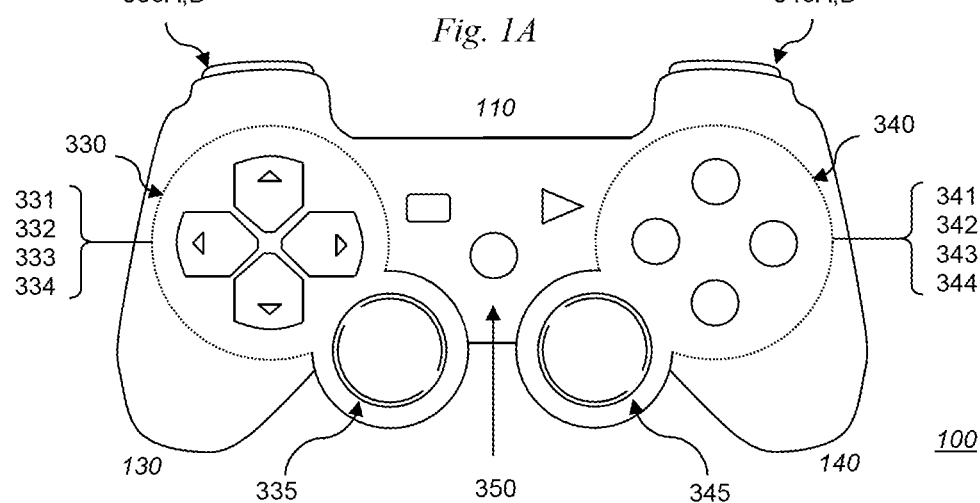

Referring to FIG. 1A, an example of a typical peripheral apparatus is the Sony® SIX-AXIS handheld game controller 100.

In a typical configuration, this controller comprises a central bridge portion 110 joining together two handle portions 130, 140.

In addition, the controller typically comprises a number of physical controls, mainly located between the bridge and handle portions. For example in FIG. 1A, a directional joypad 330 is located to the left of the controller and comprises four directional buttons 331-334, and is also located adjacent a first joystick 335. In addition at least a first shoulder button 336A,B is provided at the top-left of the controller.

To the right of the controller, a function joypad 340 comprises four function buttons 341-344. These function buttons are differentiated by their icons, such as a triangle, circle, cross and square. The function joypad is located adjacent a second joystick 345. In addition at least a first shoulder button 346A,B is provided at the top-right of the controller.

The buttons of the directional joypad and the function joypad may be differently shaped, with the buttons of the directional joypad shaped in response to their respective direction, whilst the buttons of the function joypad are generally identical in shape.

Finally, a set of buttons 350 may be positioned on the bridge of the controller that provide system-level controls, such for example a 'PS' button enabling a user to access the associated console's operating system at any time, and for example start/pause and game menu buttons.

Figure 1C:
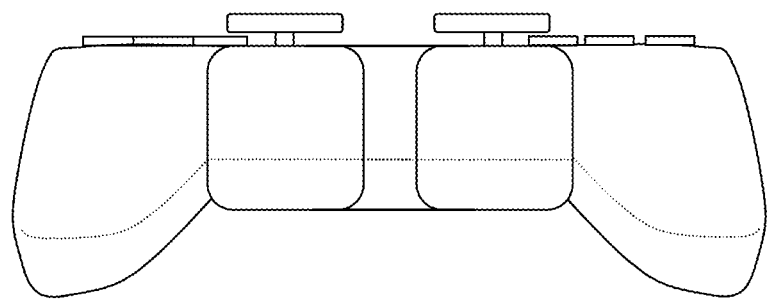

Complementary top and bottom views of the controller are shown in FIGS. 1B and 1C. As can be seen from FIG. 1B, typically there are two shoulder buttons on each side of the controller (336A and B and 346A and B), and a USB port 352 used optionally for wired communication and also for charging an internal battery (not shown).

Figure 2A:
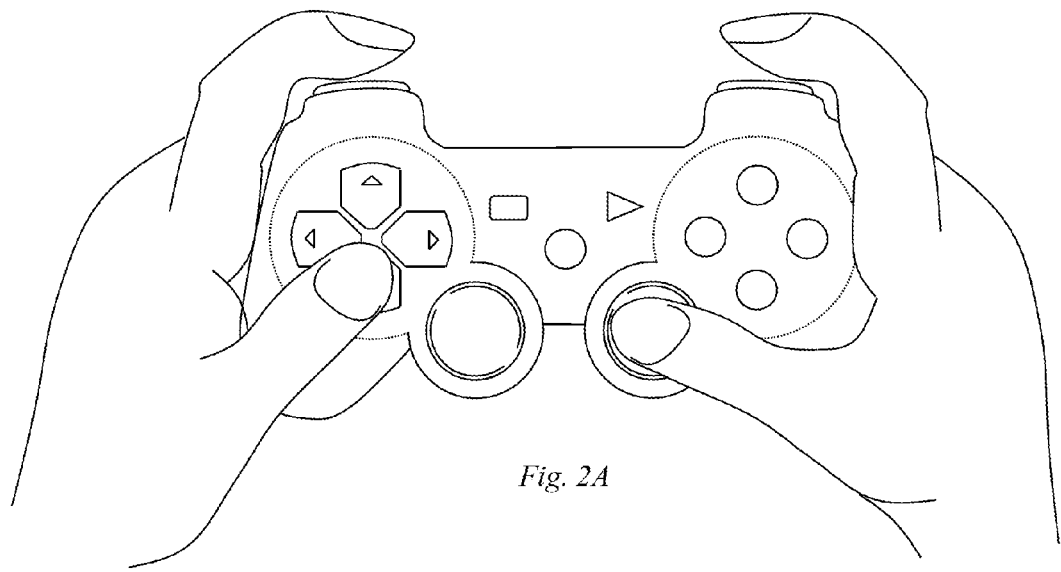
FIGS. 2A-B are schematic diagrams of a handheld videogame controller being held in use.

Referring now also to FIG. 2A, in operation a user typically grasps the handle portions and uses a combination of fingers and thumbs to access the controls. In FIG. 2A, the user controls the shoulder buttons with their index fingers and controls the joysticks, directional and function buttons with their thumbs. Their remaining three fingers (not shown) curve around the handle portions to hold the controller.

Figure 2B:
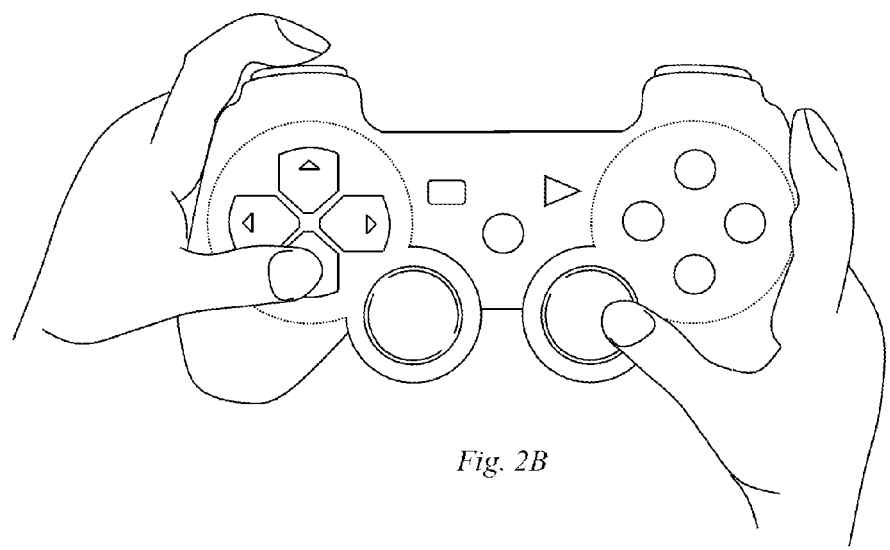

However, as illustrated in FIG. 2B, it will be appreciated that users with particularly small or large hands may find the controller difficult to operate in this manner, and indeed other users with more average hand sizes may still find the controller uncomfortable.

Consequently, in an embodiment of the present invention, some or all of the controller shell (the plastic casing that houses the components of the controller) is constructed using a 3D printing method, in response to measurements of the user's hands.

It will be appreciated that the above handheld controller is exemplary; other handheld controllers may be suited to one hand (such as the PS Move® controller) or may incorporate additional input modalities (such as the PS4 controller) or a may constitute a handheld console in their own right, by including a display and suitable processing means (such as the Wii-U controller, or the stand-alone PS-Vita).

Modifying the Shell

Figure 3A:
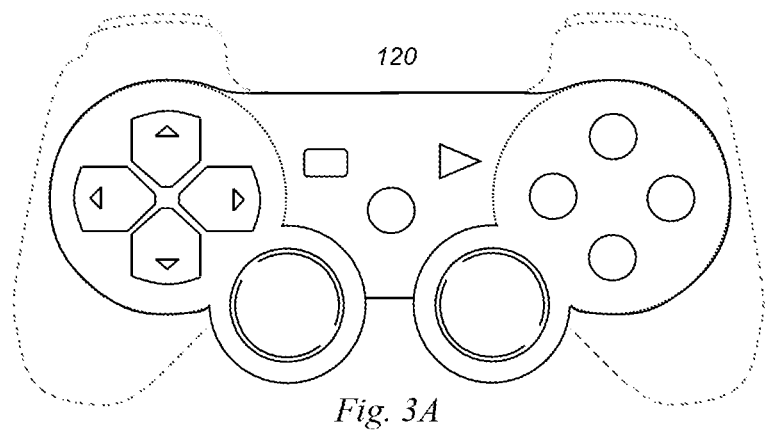
FIG. 3A is a schematic diagrams of a predefined module portion of a handheld videogame controller in accordance with an embodiment of the present invention.

Referring to FIG. 3A, a central facia 120 for housing the front assembly of buttons (and corresponding to a fixed-size printed circuit-board comprising switches aligned with those buttons) is provided. The shape of the default controller around this facia is shown in dotted lines.

The remaining shell of the controller is then added as described herein, the shell being personalised/customised in response to the user's morphology (here, in particular, of their hands), as estimated using methods also described later herein.

In an embodiment of the present invention, the remaining shell (optionally in two halves, an upper and lower half) is added directly to the central facia using a 3D printing technique. Hence for example the pre-formed central facia is positioned in a plastic powder suitable to bond with the facia, and the remaining shell is bonded to the facia by selective melting of the plastic powder over successive layers to form the complete shell or shell half, in a 3D printing technique known in the art.

Alternatively, the central facia may comprise clips, dovetailing or other mechanical attachment means, and the remaining portions of the shell are printed with corresponding attachment means so that the overall shell can be assembled in a piece-wise interlocking fashion.

Figure 3B:
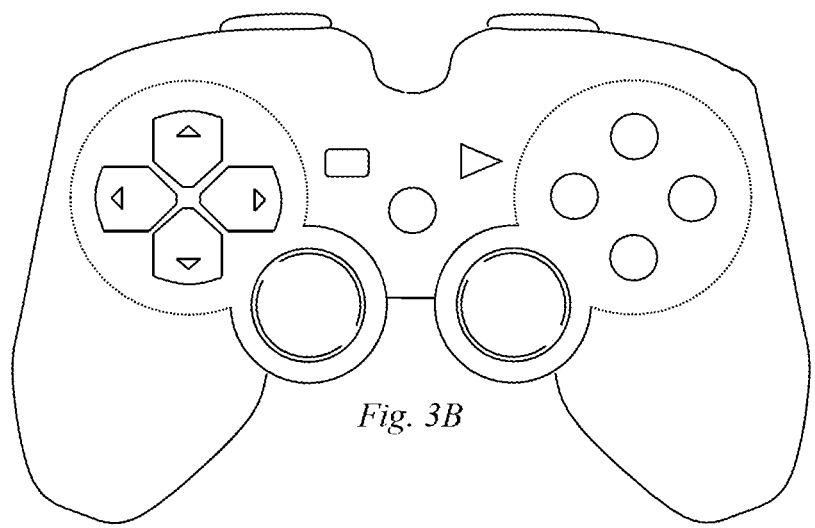
FIGS. 3B and 3C are schematic diagrams of a modified handheld videogame controller comprising 3D printed components in accordance with an embodiment of the present invention.
Figure 3C:
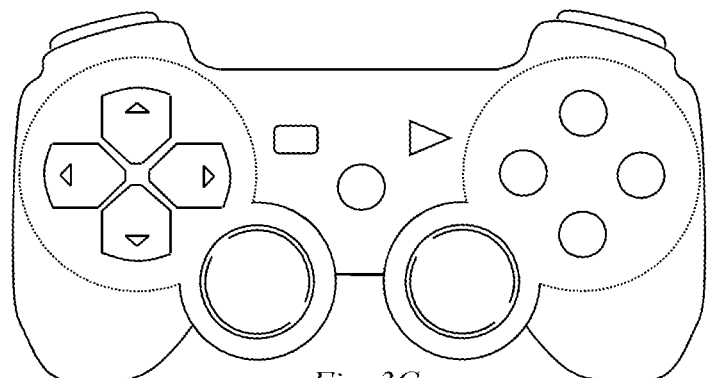

Thus referring to FIGS. 3B and 3C, tailored or bespoke controllers can be printed for users with large hands (FIG. 3B) or small hands (FIG. 3C).

In an embodiment of the present invention, the handle portions, optionally extending up to the shoulder button region, are shaped to fit the users hand as if moulded to the user's specific grip, optionally with grooves for each finger used to grip the handle portions and a profile corresponding to that of the user's palm where it comes into contact with the controller, rather as if a mould had been taken from a deformable template controller held by the user and used as the basis for the printed parts.

In another embodiment of the present invention, the basic handle portion design is parametrically adjusted in response to key measurements of the user's hands so that the resulting controller fits comfortably without necessarily being moulded for an exact full-contact fit (although some moulding, for example finger grooves, may also be provided).

Figure 4:
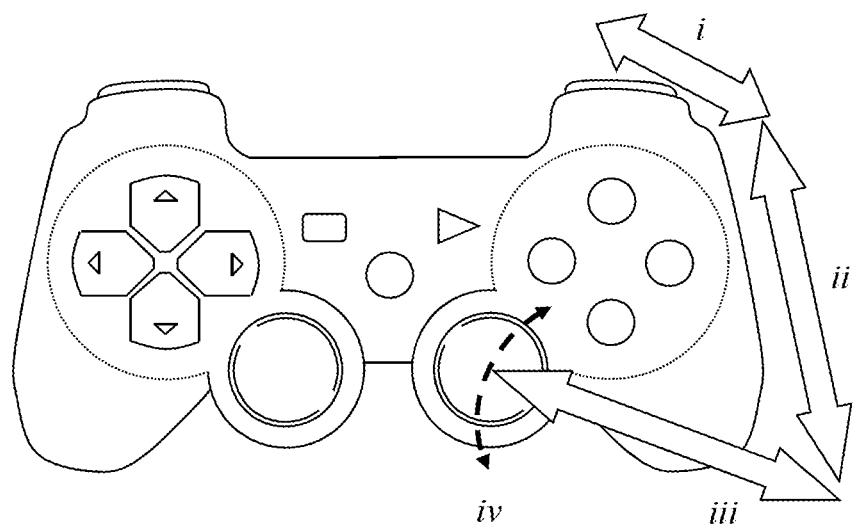
FIG. 4 is a schematic diagram of measurements of a user's hand in accordance with an embodiment of the present invention.

Referring to FIG. 4, in an embodiment of the present invention key parameters comprise:
 i. the length of the user's index finger;
 ii. the combined length of the first two joints of the index finger;
 iii. the length between the lowest joint of the index finger and the rotational base of the thumb;
 iv. the length of the thumb; and
 v. the arcuate range of the thumb.

Note that this list is exemplary; for example the arcuate range of the thumb need not be explicitly measured, and meanwhile the diametric length across the palm may be used instead of or in addition to the length between the lowest (first) joint of the index finger and the rotational base of the thumb as a guide to handle portion length.

The above parameters may be used as follows:

Parameter i. or ii. may be used to reposition the shoulder buttons so that the index finger, bending over the top of the handle portion, naturally rests the finger pad on a shoulder button. As seen in FIG. 3C, it may optionally also be used to select whether the shoulder button should be re-angled so that the user's finger naturally rests tangentially on it (this may be of particular relevance to smaller users).

Parameter iii. may be used to select the length of the handle portion so that it occupies the user's hand comfortably (e.g. not terminating in the user's palm during normal use). This may be coupled with extending the height of the controller's shoulders if required.

Parameter iv. may be used to select the width of the handle portion so that the user's thumb can easily reach both the respective joystick and also the most distant button in the respective set of directional or function buttons described previously. The buttons mounted in the central bridge area are not expected to be necessarily easy to reach during a normal hold of the controller.

Parameter v. may be used to adjust the angle of the handle portion relative to the bridge, so that the arcuate range of movement of the user's thumb comfortably encompasses an arc between the joystick and the local set of control buttons. It may also be used to adjust the height of the controller's shoulder so that the lower range of movement of the user's thumb encompasses the range of movement of the joystick.

With regards to the joystick, if the components therein are not fixed to the main circuit board of the controller, then the joysticks themselves may be moved in response to the above parameters, for example to different positions on the circumference of a notional circle surrounding the local set of control buttons (as a non-limiting example, by up to ±15° from its default position).

In this way, a parametric reconfiguration of the basic controller design is made possible in response to measurements of the user's hands so as to improve the ergonomics of the controller for that user.

Coupling Buttons

Whether the controller is modified using a full moulding or a parametric reconfiguration, in the embodiments above the shoulder button(s) are optionally moved outward or inward to accommodate the user's finger size. Similarly the joysticks may be moved. In principle, the other control buttons may also be similarly adjusted, for example to be larger and/or occupy a larger circle, or to be shifted slightly as a set.

To couple these buttons to the fixed size circuit board underneath (or more generally to fixed position switching components), in an embodiment of the present invention a computer program controlling the 3D printing process adjusts the shaping of the buttons as illustrated in FIGS. 5A-D.

Figure 5A:
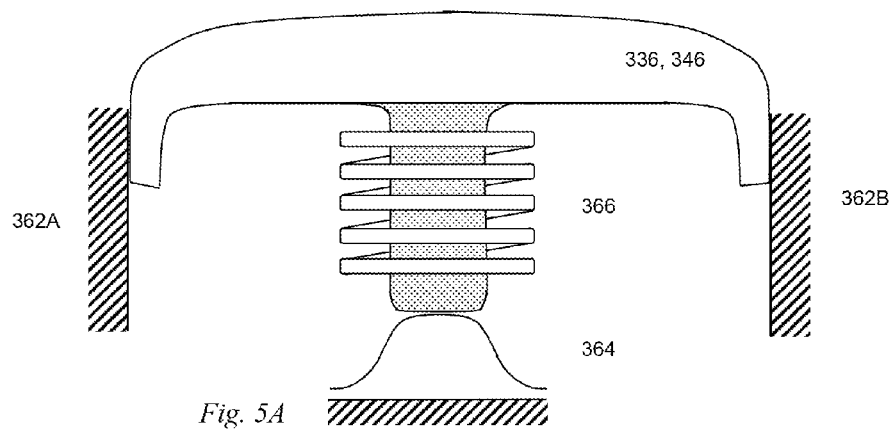

In FIG. 5, the shoulder button 336, 346 is positioned in a corresponding hole in the shell with edges 362A,B (seen in section in FIG. 5A). The button and edges may comprise tongue-and-groove channels to guide smooth parallel depression of the button independent of where on the surface of the button force is applied by the user.

Underneath the button, a switch 364 is provided. In this example, the switch is a pressure sensitive switch with proportional output, created by deformation of a resilient dome that changes the effective contact surface area between the dome and a substrate, thereby detectably changing the resistance or capacitance of the switch (depending on type). This allows the shoulder button to provide proportional input control. The shoulder button is mechanically linked to the switch by a protrusion under the button. The button is restored to its rest position by a spring (shown here by way of example as encircling the protrusion itself).

Figure 5B:
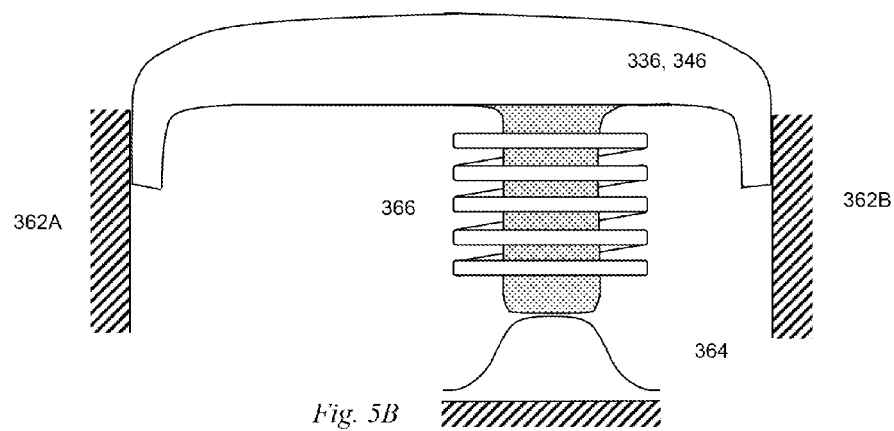
Figure 5C:
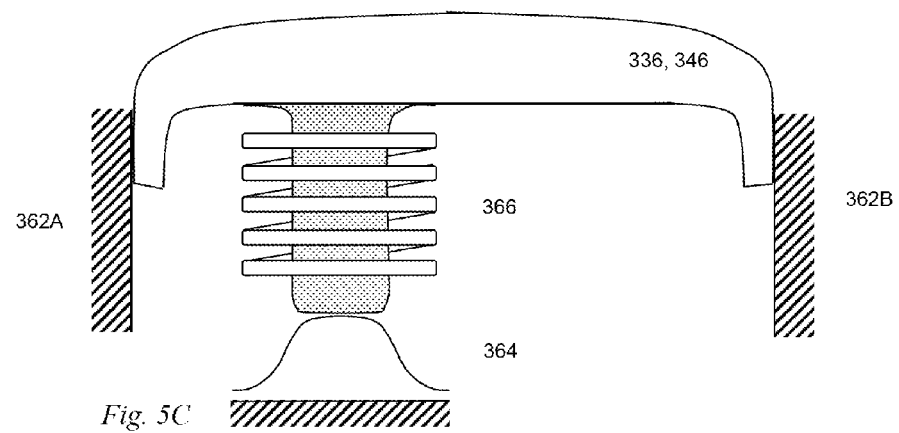

In embodiments of the present invention, if the shoulder buttons are moved left or right and/or extended, the computer program controlling the 3D printing process repositions the protrusion extending beneath the button to maintain the relative position of the protrusion with the fixed switch beneath, as shown in FIGS. 5B and 5C.

In the event that the button is moved to such an extent that it no longer overlaps the position of the switch at all, then the computer program controlling the 3D printing process may select an alternative protrusion form comprising for example an 'L' shape that extends to couple the button to the switch, as shown in FIG. 5D.

Alternatively or in addition, several models of circuit board may be provided (for example, 'child', 'standard' and 'oversized') with different predetermined positions of switches. When a button no longer overlaps the switches on the 'standard' circuit board, the 'child' or 'oversized' board is selected as appropriate and the positions of protrusions to couple with the newly selected circuit-board are recalculated.

In this way, buttons of the controller can be (at least to a limited extent) repositioned to improve the user's comfort, whilst still mechanically coupling to the predefined and fixed circuit board underneath, or to one of a limited range of predefined and fixed circuit boards.

Production

As noted above, it is proposed that at least some and possibly all of the shell of the controller is 3D printed. If only some of the shell is printed, for example with the central facia, circuit-board and battery in a pre-assembled module, then in principle this enables a user to print the remaining elements on a domestic 3D printer, with the final assembly being relatively straightforward for the end user.

A number of 3D printing mechanisms are available. A popular mechanism for domestic printers is fused deposition modelling (FDM), in which a thermoplastic filament is supplied to an extrusion nozzle where it is melted and deposited to form a small plastic bead that immediately hardens. Each bead may thus be thought of as a voxel, or 3D pixel, typically in the order of 0.1 mm in diameter, and the desired object is built using these voxels, typically on a layer-by-layer basis. FDM is useful for creating relatively simple, monolithic structures, as the deposition process relies upon the underlying partially built object for support. Consequently in the case of a controller where there are separate moving parts (e.g. buttons), it may be preferable to provide conventional controller buttons separately as a kit, and print the shell so that these buttons can be inserted into it. Alternatively these may be printed separately, particularly where they are to be modified as described above, or they may be printed as part of the controller but attached to it by sacrificial supporting structures that the user must cut once printing is finished.

As an alternative, for example at a retail store (though this is non-limiting), selective laser sintering (SLS) of a plastic powder may be used. In this technique, a layer of fine plastic powder is placed on a bed, and a laser is fired at the powder to heat and fuse a small region together, so again forming a plastic bead or voxel. Once a layer of voxels has been formed, a new layer of powder is deposited over it, and the next layer is printed. The melting by the laser causes the newly formed molten voxel to also fuse with any voxel beneath it, so forming the overall object on a layer by layer basis. This method has the advantage that delicate and mechanically intricate structures can be formed because they are supported within the surrounding powder as they are being built. Consequently using SLS would be simpler than FDM for printing parts of the controller complete with movable buttons, thereby in turn simplifying eventual assembly and potentially increasing the modification options available compared to the FDM method.

Other 3D printing options also exist and may be selected as applicable. For example, photopolymerisation fuses liquid plastic with a beam of ultraviolet light that solidifies the liquid to form objects.

Consequently, a domestic production kit may include a pre-assembled module and the suitable plastic filament (or powder as appropriate), together with access to a computer program for controlling the 3D printing process.

As noted above, in one embodiment the remaining components are bonded to the pre-assembled module directly, whilst in another the remaining components are printed with attachment members positioned to complement those provided in the pre-assembled module, enabling these to be snapped together, glued, screwed and/or in some other manner securely assembled.

The speed of current 3D printing technology is roughly proportional to the cost of the printer, and so one may expect domestic 3D printers to be relatively slow (whilst still also being relatively costly) and potentially also less accurate than more expensive commercial 3D printers.

Consequently in an embodiment of the present invention, 3D printing is conducted using a more expensive, but faster, non-domestic printing service. This may be provided by a retailer that the user can visit (for example a videogame store or a Sony centre), or by a postal service (depending on the measurement scheme used; see later herein).

Depending on whether the domestic or non-domestic printing systems allow it, it will be appreciated that the shell may be printed using more than one material. For example, the shell may include a comparatively more flexible material at gripping positions on the shell handle portions. Alternatively the shell may be designed to allow soft or flexible patches to be affixed on it, for example by providing recesses and clip-on points for such patches. The position of such patches or flexible materials may be responsive to measurements of the user's hands in a similar manner to the other parameters described previously herein.

Alternatively or in addition, the texture of the shell surface may be modified by the printing process to be smooth or slightly rough in different regions, thereby providing gripping surfaces at appropriate positions on the handles responsive to measurements of the user's hands.

In the case where a plurality of models of circuit board exists, a retailer or postal provider may stock each of these and so provide more flexibility to customise controllers for a user than a domestic kit. Alternatively of in addition, the process of ordering a kit may include an initial hand measurement and assessment (as detailed below) so that the appropriate sized circuit-board can be included in the kit.

Measuring Hands

For domestic kits and also for registration and postal embodiments, current and in particular next-generation consoles have access to high resolution cameras. In the case of the announced PlayStation 4, the camera is stereoscopic, with a resolution of 1280×800 pixels. This is sufficient to obtain a clear image of the user's hands from which to determine either the parameters described previously herein, or to model a virtual mould defining the required deformations to the controller to make it fit the user's hands more precisely as described previously. Such a mould may be generated using an image of the user's hand and comparing it to a skeletomuscular model of a default hand to determine how it would vary from the default hand when gripping the controller. The variations can then be applied to a moulding based on the default hand.

To model the hand and/or obtain the required parameters, software running on the console could ask the user to hold up each hand in turn in one or more poses so as to determine, for example, the axis of rotation of the thumb of the user.

In addition, the absolute size of the user's hand may be determined with reference to a known object by asking the user to hold a reference object, such as a Sony Move® controller, an existing SIX AXIS handheld controller, or indeed the pre-assembled module comprising the central facia, circuit-board and battery if this is being used. Other common objects with a standard size may also be used to determine absolute size, such as a CD, DVD or Blu-Ray®.

Alternatively or in addition, the size of the user's hands may be estimated using a distance measure computed from the stereoscopic disparity between images of the user's hand captured by a stereoscopic camera, if the console has access to one. Given the optical properties of the camera, the length-per-pixel of an object at a given distance can be computed to give dimensions of the user's hand.

The hand measurements determined by the console may then be used by the computer program controlling the 3D printing process as described previously herein. This computer program may run locally to drive a domestic 3D printer operably coupled to the console, or it may be a remotely run program to which the hand measurements are sent.

For example, the hand measurements and registration details may be sent to a 3$^{rd}$ party 3D printing service, which produce and post the resulting controller back to the user. Alternatively, the hand measurements may be associated with the user's login details on the PlayStation Network (or an equivalent console network). The user may then visit a retailer and log in to the network there, enabling the 3D printing system of the retailer to access the hand measurements. The Network could be aware of the IP address of registered retailers, and only return hand measurements in response to login requests from such devices.

Alternatively or in addition to domestic measurement, as part of the 3D printing system hosted by a retailer, a measurement system may be included.

Such a measurement system may simply comprise the same system as the domestic system, so that the modelling software is the same. However, in a retail environment a dedicated booth or similar area may be provided that assists with accurate measurement. For example, a controller in a high-contrast colour (such as blue or green) may be provided at a fixed distance from the camera; the system can then take an image of the user's hands in a gripping pose.

The user may be asked to push buttons or operate a joystick on the fixed controller so that their range of movement can also be captured in images.

Due to the controlled environment and the provision of a reference object, these images can be used to determine the absolute size of the user's hands and also many if not all of the relevant parameters required to produce a version of the controller for them.

Again, the user may also be asked to simply present their hands open to the camera so that the complete hand can be modelled for any additional moulding to the controller, as described previously.

Once the parameters and/or moulding have been computed, the retailer's 3D printer may be used to generate the new controller parts, either directly onto a module or to mechanically engage with a module as described previously, or to create the complete shell.

It will be appreciated that as more controllers are generated using this scheme, a central database of user hand morphologies can be accumulated. Optionally, these may be categorised, for example by using histogram bins with ±N % tolerance of shape deviation. If there are morphologies classified this way with a significantly large population, then this may be communicated to retailers, who may wish to print such controllers in advance.

Alternatively or in addition, the controller manufacturer may wish to conventionally produce modular handle/shoulder portions for such common morphologies. A retailer may then offer such off-the-shelf controller sizes to users as an alternative to a slower to print, but bespoke, personally measured version.

Variants—Move Controller

In addition to two-handed controllers, another common controller form factor is the one-handed controller or 'wand', such as the Sony Move® controller.

Similar principles to those recited above can apply to such a controller; typically there will be components of the controller that cannot be easily modified (such as the size of the glowing ball on the mode controller, or the positioning and/or separation of light sources on other such controllers), but aspects of the handle and optionally positioning of at least some buttons may be adjusted in response to measurements of the user's hand.

For example, the circumference of the wand may be adjusted in response to the size of the users' hand. If the wand is small, or is itself a peripheral to a main wand (for example to be held in the user's less dominant hand) then the overall size or length of the wand may be adjusted to comfortably rest in the user's palm. The specific ergonomic factors will depend on the peripheral and can be selected as appropriate by the designer.

Variants—Active Shutter Glasses #1

Another peripheral mentioned previously is active shutter glasses. Again typically the main components are of a fixed size (i.e. the receiver assembly and the LCD lenses), but these need to fit comfortably on the wearer's head.

In this case again similar principles to those recited above can be applied.

Specifically, components of the glasses can be printed in response to the user's morphology (specifically in relation to their head). Such components include as the bridge portion of the glasses, lateral extensions of the frames, the arms of a particular length and mounted at a particular height on the frames, and the curvature of the ends of the arms.

Hence key parameters for such glasses are eye separation distance, nose width at the expect point of support for the glasses, head width, and ear placement, both in terms of distance from the position of the glasses and in terms of relative height.

Again these elements of the glasses may be bonded directly to the existing frame of each LCD lens, but more likely is that at least some of these components would be screwed, glued or otherwise assembled onto the existing frames of the LCD lenses.

Variants—Active Shutter Glasses #2

For people who already wear glasses, optionally clip-on active shutter glasses may be printed in response to the particular dimensions of the user's own glasses. Such clip-on active shutter glasses would thus comprise clips that matched the separation of the arms on the user's own glasses and which suitably fitted the thickness of the arms on the user's own glasses. The frame between the clips and the LCD lenses is then printed to place the LCD lenses centrally in front of the user's own glasses lenses, with a connecting bridge portion that does not require a nose support of its own.

In this case, clearly it is the relevant dimensions of the user's own glasses that are measured from captured images.

Variants—VR Headsets

Virtual reality headsets such as the Sony HMZ-T1 require that the small display panels mounted in the headset are aligned with the user's eyes properly to achieve a realistic and comfortable 3D effect. Consequently the headset should be securely and repeatable wearable in this preferred configuration.

Consequently conventional headsets have a number of adjustable straps and the like to ensure a good fit for the wearer. However, it will be appreciated that the techniques described herein are applicable for generating a bespoke moulding corresponding to the user's head that can be clipped onto the inner circumference of a VR helmet, so that the VR helmet always sits comfortably at the same position on the user's head.

Hence in this embodiment, the computer program controlling the 3D printing process generates a ring (or partial ring) with an outer circumference shaped to fit the VR helmet (optionally with suitable attachment means or points of fixture) and an inner circumference moulded or parametrically adjusted in response to the user's morphology (in particular their head in the region where the device will be worn).

The measurements may be taken using a video camera, but for those parts of the head obscured by hair, it may be necessary to model how the hair interacts with the headset. The simplest way to do this is to wear a rubber skullcap or rubber band of similar size to the cap or ring of the headset, thereby compressing the hair and revealing the shape of the head and compressed hair as they would be when wearing the headset. This would enable the insert for the headset to still be measured in a domestic environment, thereby allowing for domestic printing and postal printing. Such a scheme would also be suitable for retailers.

Alternatively more complex measurements may be made either using pressure sensors on the user's head, or optical means that are not affected by the user's hair, such as T-ray imaging systems. However, clearly these are less suited to domestic applications and are also likely to be considerably more expensive.

Other variants amenable to the same principles may be apparent to the skilled person, such as close-fitting biometric and biofeedback peripherals for heart-rate sensing and the like.

Finally, in addition to the utilitarian ergonomic adjustments made to peripherals as described previously herein, these may be combined with aesthetic modifications, such as embossing a preferred game character on the controller, or theming the controller to a game by, for example, printing a move controller to resemble a magic wand for a fantasy game.

Summary Embodiment

Figure 6:
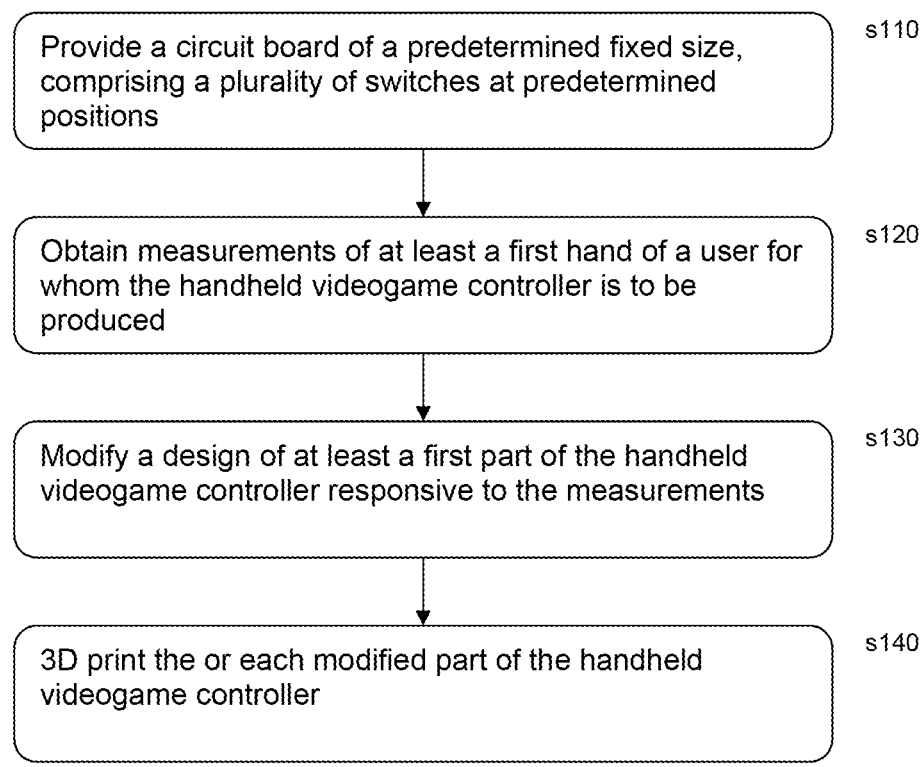
FIG. 6 is a flow diagram of a method of producing a handheld videogame controller in accordance with an embodiment of the present invention.

Referring to FIG. 6, in a summary embodiment of the present invention, a method of producing a handheld videogame controller (100, 100', 100", such as SIX-AXIS controller, Move controller, or PSVita) comprises:

In a first step s110, providing a circuit board of a predetermined fixed size (for example as part of a predefined module 120), comprising a plurality of switches at predetermined positions;

In a second step s120, obtaining measurements of at least a first hand of a user for whom the handheld videogame controller is to be produced;

In a third step s130, modifying a design of at least a first part of the handheld videogame controller responsive to the measurements; and In a fourth step s140, 3D-printing the or each modified part of the handheld videogame controller.

In an instance of the summary embodiment, the step of modifying the design of at least a first part of the handheld videogame controller comprises adapting the modified design to maintain functional co-operation with the switches of the circuit board (e.g. maintaining a mechanical linkage between the button and the switch, as described previously).

In an instance of the summary embodiment, then as noted above the circuit board is provided as part of a module comprising a pre-defined facia (120).

In an instance of the summary embodiment at least one modified part is 3D printed directly onto at least one pre-defined part of the controller. Hence for example the handle portions may be printed directly onto the module using fused deposition modelling.

However, in an instance of the summary embodiment, at least one modified part is further modified to comprise an attachment means to complement an attachment means located on a pre-defined part of the controller. Hence a clip, for example, may be positioned on the handle portions that aligns with a corresponding clip on the pre-defined module.

In an instance of the summary embodiment, the measurements of at least a first hand of a user (assuming symmetry; of course both hands may be explicitly measured) comprises obtaining one or more selected from the list consisting of the length of the user's index finger, the combined length of the first two joints of the index finger, the length between the lowest joint of the index finger and the rotational base of the thumb, the diametric length across the palm, the length of the thumb, and the arcuate range of the thumb.

Consequently, the step of modifying a design of at least a first part of the handheld videogame controller may comprise as applicable one or more selected from the list consisting of:
  i. modifying the position of a shoulder button of the controller responsive to the length of the user's index finger;
  ii. modifying the position of a shoulder button of the controller responsive to the combined length of the first two joints of the user's index finger;
  iii. modifying the length of a handle portion of the controller responsive to the length between the lowest joint of the index finger and the rotational base of the thumb;
  iv. modifying the length of a handle portion of the controller responsive to the diametric length across the palm of the user's hand;
  v. modifying the width of a handle portion of the controller responsive to the length of the user's thumb; and vi. modifying the angle of a handle portion of the controller relative to a central portion of the controller responsive to the arcuate range of the user's thumb.

In an instance of the summary embodiment, if the step of modifying the design of at least a first part of the handheld videogame controller comprises repositioning a button (336, 346) that should mechanically couple to a switch (364) on the circuit board, the design is further modified to adapt the mechanical linkage (366) between the repositioned button and the switch in order to maintain the mechanical coupling, as described previously with respect to FIGS. 5A-D.

However, in an instance of the summary embodiment, if the step of modifying the design of at least a first part of the handheld videogame controller comprises repositioning a button that should mechanically couple to a switch on the circuit board by more than a predetermined extent, then one of a predetermined number of alternative circuit boards each of a respective predetermined fixed size is selected that most reduces the relative change in position between the respective switch on the circuit board and the respective button. The predetermined extent may be where the button (or the part of the button that may form a base for the mechanical linkage) no longer overlaps the movable part of the switch (i.e. FIGS. 5A-C are within the predetermined extent, but FIG. 5D is not). Clearly, even after selecting a new circuit board, the or each button may require modification of its mechanical linkage.

In a summary embodiment of the present invention, a handheld videogame controller kit comprises a circuit board of a predetermined fixed size, comprising a plurality of switches at predetermined positions (for example as part of a predefined module 120), a suitable quantity of plastic material suitable for 3D printing (plastic filament or powder suitable for forming parts of the controller), and access to a computer program operable when run on a suitable computer to modify a design of at least a first part of the handheld videogame controller responsive to measurements of at least a first hand of a user for whom the handheld videogame controller is to be produced and control a 3D printer to print the or each modified part of the handheld videogame controller. Hence the kit may comprise an optical disc comprising the software, or an access code redeemable to access or unlock the software from an on-line source. The suitable computer will typically be the console for which the controller is being made, at least in a domestic scenario, though in a retail or postal scenario as described above the suitable computer may be a general purpose PC.

In a summary embodiment of the present invention, a handheld videogame controller (100, 100', 100") comprises a circuit board of a predetermined fixed size, comprising a plurality of switches at predetermined positions (for example as part of a predefined module 120), and at least a first part of the handheld videogame controller in which a default design of the handheld videogame controller has been modified responsive to measurements of at least a first hand of a user, and then 3D printed.

In an instance of the summary embodiment, at least a first 3D printed element of the handheld videogame controller (for example a shoulder button 336, 346) has been modified in dependence upon the modification responsive to measurements of at least a first hand of a user, to maintain functional co-operation with a switch of the circuit board (for example as described previously with reference to FIGS. 5A-D).

Figure 7:
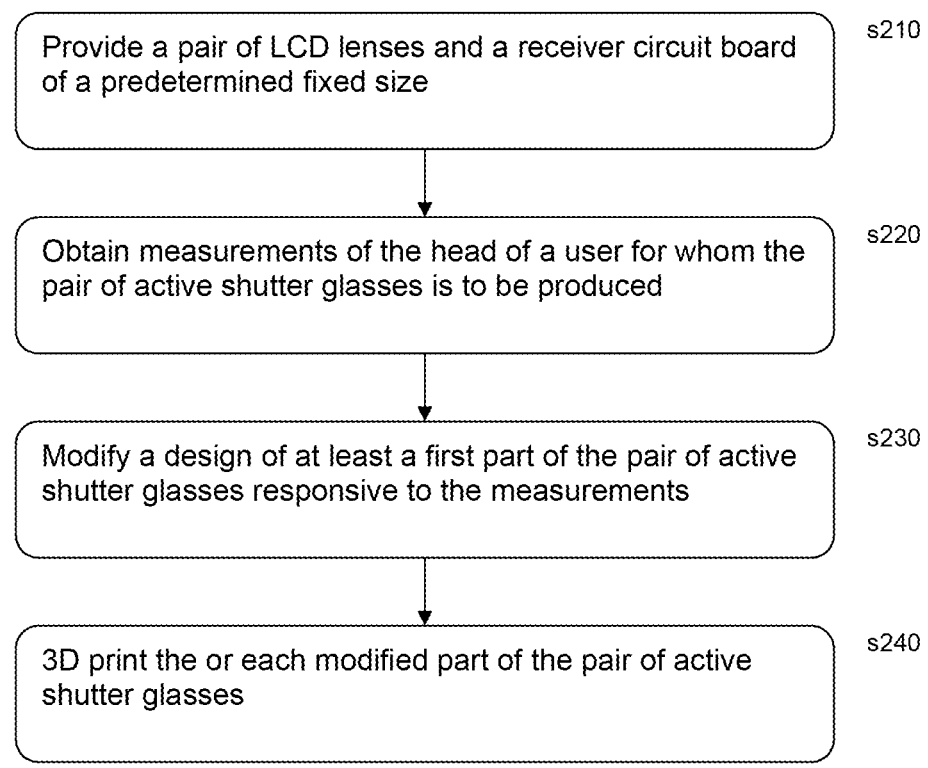
FIG. 7 is a flow diagram of a method of producing a pair of active shutter glasses in accordance with an embodiment of the present invention.

Referring to FIG. 7, in a summary embodiment of the present invention, a method of producing a pair of active shutter glasses comprises:

In a first step s210, providing a pair of LCD lenses and a receiver circuit board of a predetermined fixed size;

In a second step s220, obtaining measurements of the head of a user for whom the pair of active shutter glasses is to be produced;

In a third step s230, modifying a design of at least a first part of the pair of active shutter glasses responsive to the measurements; and In a fourth step s240, 3D printing the or each modified part of the pair of active shutter glasses.

In an instance of the summary embodiment, the step of modifying the design comprises modifying, in response to measurements of the head of the user, one or more selected from the list consisting of:
  i. the bridge portion of the glasses, responsive to eye separation distance;
  ii. the bridge portion of the glasses, responsive to nose width at the expected point of support for the glasses;
  iii. the lateral extension of the frames, responsive to head width;
  iv. the respective length of the arms of the glasses, responsive to ear placement; and
  v. the respective vertical position of the arms of the glasses, responsive to ear placement.

Finally it will be appreciated that the Cell processor or other processors of a PS3, or the processor of any suitable console or other general purpose computer, may implement the above described methods and techniques as applicable when operating under suitable software instruction.

Hence it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The following numbered clauses define further example aspects and features of the present technique:

Clause 1. A handheld videogame controller kit, comprising:
  a circuit board of a predetermined fixed size, comprising a plurality of switches at predetermined positions;
  a suitable quantity of plastic material suitable for 3D printing; and access to a tangible non-transitory product computer program product operable when run on a suitable computer to modify a design of at least a first part of the handheld videogame controller responsive to measurements of at least a first hand of a user for whom the handheld videogame controller is to be produced; and control a 3D printer to print the or each modified part of the handheld videogame controller.

Clause 2. A method of producing a pair of active shutter glasses, comprising the steps of:

providing a pair of LCD lenses and a receiver circuit board of a predetermined fixed size;

obtaining measurements of the head of a user for whom the pair of active shutter glasses is to be produced;

modifying a design of at least a first part of the pair of active shutter glasses responsive to the measurements; and 3D printing the or each modified part of the pair of active shutter glasses.

The invention claimed is:

1. A method of producing a handheld videogame controller, comprising the steps of:

providing a circuit board of a predetermined fixed size, the circuit board comprising a plurality of switches at predetermined positions;

obtaining measurements of at least a first hand of a user for whom the handheld videogame controller is to be produced;

modifying a design of at least a first part of the handheld videogame controller responsive to the measurements; and 3D printing one or more modified parts of the handheld videogame controller using the modified design;

wherein each of the plurality of switches is arranged to mechanically couple with a corresponding button on the handheld videogame controller; and wherein the circuit board is provided as part of a module comprising a pre-defined facia.

2. The method of claim 1, in which the step of modifying the design of at least a first part of the handheld videogame controller comprises adapting the modified design to maintain functional co-operation with the switches of the circuit board.

3. The method of claim 1, in which at least one of the one or more modified parts is 3D printed directly onto at least one pre-defined part of the controller.

4. The method of claim 1, in which at least one of the one or more modified parts is further modified to comprise an attachment means to complement an attachment means located on a pre-defined part of the controller.

5. The method claim 1, in which the step of obtaining measurements of at least a first hand of a user comprises obtaining one or more measurements selected from the list consisting of:

i. a length of the user's index finger on the first hand;
ii. a combined length of the first two joints of the index finger;
iii. a length between a lowest joint of the index finger and a rotational base of a thumb of the first hand;
iv. a diametric length across a palm of the first hand;
v. a length of the thumb; and
vi. an arcuate range of the thumb.

6. The method of claim 5, in which in which the step of modifying a design of at least a first part of the handheld videogame controller comprises as applicable one or more selected from the list consisting of:

i. modifying a position of a shoulder button of the controller responsive to the length of the user's index finger;
ii. modifying a position of the shoulder button of the controller responsive to the combined length of the first two joints of the user's index finger;
iii. modifying a length of a handle portion of the controller responsive to the length between the lowest joint of the index finger and the rotational base of the thumb;
iv. modifying a length of the handle portion of the controller responsive to the diametric length across the palm of the user's hand;
v. modifying a width of the handle portion of the controller responsive to the length of the user's thumb; and
vi. modifying an angle of the handle portion of the controller relative to a central portion of the controller responsive to the arcuate range of the user's thumb.

7. The method of claim 1, wherein when the step of modifying the design of at least a first part of the handheld videogame controller comprises repositioning a button that should mechanically couple to a switch on the circuit board, the design is further modified to adapt a mechanical linkage between the repositioned button and the switch in order to maintain the mechanical coupling.

8. A method of producing a handheld videogame controller, comprising the steps of:

providing a circuit board of a predetermined fixed size, the circuit board comprising a plurality of switches at predetermined positions;

obtaining measurements of at least a first hand of a user for whom the handheld videogame controller is to be produced;

modifying a design of at least a first part of the handheld videogame controller responsive to the measurements; and 3D printing one or more modified parts of the handheld videogame controller using the modified design, wherein when the step of modifying the design of at least a first part of the handheld videogame controller comprises repositioning a button that should mechanically couple to a switch on the circuit board by more than a predetermined extent, then one of a predetermined number of alternative circuit boards each of a respective predetermined fixed size is selected that most reduces a relative change in position between the respective switch on the circuit board and the respective button.

9. A handheld videogame controller, comprising:

a circuit board of a predetermined fixed size, comprising a plurality of switches at predetermined positions, the circuit board being provided as part of a module comprising a pre-defined facia; and at least a first part of the handheld videogame controller, in which a default design of the handheld videogame controller has been modified responsive to measurements of at least a first hand of a user, and has been formed by 3D printing;

wherein each of the plurality of switches is arranged to mechanically couple with a corresponding button on the handheld videogame controller.

10. A handheld videogame controller according to claim 9, in which at least a first 3D printed element of the handheld videogame controller has been modified in dependence upon a modification responsive to measurements of at least a first hand of a user, to maintain functional co-operation with a switch of the circuit board.

11. A handheld videogame controller according to claim 10, in which when the handheld videogame controller has been modified to reposition a button that should couple to a switch on the circuit board, the handheld videogame controller comprises a modified mechanical linkage between the repositioned button and the switch in order to maintain a mechanical coupling.

12. The method of claim 7, wherein adapting the mechanical linkage between the repositioned button and the switch in order to maintain the mechanical coupling includes repositioning a protrusion extending along a portion of the button to maintain a relative position of the protrusion with the switch.

* * * * *